(12) United States Patent
Cheng

(10) Patent No.: US 8,379,167 B2
(45) Date of Patent: Feb. 19, 2013

(54) LIGHT-REFLECTING STRIP AND LIQUID CRYSTAL DISPLAY DEVICE INCLUDING SAME

(75) Inventor: Allen Cheng, Chang Hwa Hsien (TW)

(73) Assignee: Taiwan Paiho Limited (TW)

( * ) Notice: Subject to any disclaimer, the term of this patent is extended or adjusted under 35 U.S.C. 154(b) by 257 days.

(21) Appl. No.: 12/801,844

(22) Filed: Jun. 29, 2010

(65) Prior Publication Data

US 2011/0187968 A1 Aug. 4, 2011

(30) Foreign Application Priority Data

Jan. 29, 2010 (TW) .............................. 99102668 A

(51) Int. Cl.
G02F 1/1335 (2006.01)
(52) U.S. Cl. ........................................................ 349/67
(58) Field of Classification Search ..................... 349/67
See application file for complete search history.

(56) References Cited

U.S. PATENT DOCUMENTS

| | | | |
|---|---|---|---|
| 8,115,996 B2 * | 2/2012 | Kitabayashi | 359/443 |
| 2003/0214718 A1 | 11/2003 | Kaminsky et al. | |
| 2005/0185279 A1 | 8/2005 | Mullen et al. | |
| 2005/0248843 A1 * | 11/2005 | Maruta et al. | 359/459 |

FOREIGN PATENT DOCUMENTS

| | | |
|---|---|---|
| WO | 9908139 A1 | 2/1999 |
| WO | 2009146446 A1 | 12/2009 |

OTHER PUBLICATIONS

Patent search report of European Patent Application No. 10 171 246.1, which is a corresponding European patent application.

* cited by examiner

Primary Examiner — Sung Pak
(74) Attorney, Agent, or Firm — Bacon & Thomas, PLLC

(57) ABSTRACT

One aspect of the present invention provides a light-reflecting strip for a liquid crystal display device. The light-reflecting strip includes a light-reflecting substrate having a configuration surface and a smooth surface; a light-reflecting base layer coated on the configuration surface; a reflecting layer deposited on the light-reflecting base layer by evaporation deposition; a high transmittance colorant layer printed on the reflecting layer by means of a screen printing with a screen having a mesh number greater than 300; an adhesive layer applied on the smooth surface of the light-reflecting substrate; and a release paper detachably adhered to the adhesive layer. Another aspect of the present invention provides a liquid crystal display device including the light-reflecting strip.

6 Claims, 2 Drawing Sheets

LIGHT-REFLECTING STRIP AND LIQUID CRYSTAL DISPLAY DEVICE INCLUDING SAME

FIELD OF THE INVENTION

The present invention relates generally to a high reflectivity light-reflecting strip, especially a light-reflecting strip used as a passive light source of a liquid crystal display device, and a liquid crystal display device including the high reflectivity light-reflecting strip.

BACKGROUND OF THE INVENTION

A flap panel display, such as a liquid crystal display (LCD), is widely used in various electronic apparatuses as a device to display information or images. When displaying information or images, the LCD requires a back light source, such as cold cathode tubes or light-emitted diodes (LEDS), to display the information or images. However, these back light sources not only consume electric power of the electronic apparatus in which they are installed but also produce a substantive amount of heat. For hand-held or mobile electronic apparatuses, such as notebook type personal computers or cell phones, the electric power is provided by batteries. Therefore, minimizing the power consumption of the liquid crystal displays used in these hand-held or mobile electronic apparatuses to prolong the operation time of these portable devices is one of the objectives in the related industries. Additionally, under the trend of lighter, thinner and smaller of the portable electronic apparatuses, electric components, including the liquid crystal display, are installed in a more limited space in a more compact manner and this makes the heat dissipation problem becomes an issue that needs to be effectively solved.

Therefore, there exists a need in portable electronic apparatus industry for a liquid crystal display device that consumes less electric power and generates less heat.

SUMMARY OF THE INVENTION

In view of the above-mentioned disadvantages/problems associated with the existing liquid crystal display, one object of the present invention is to provide a light-reflecting strip for a back-light module of a liquid crystal display so as to reduce the number of light sources used in the back-light module and to achieve the goal of reducing the electric power consumption and heat generation. Another object of the present invention is to provide a liquid crystal display device that includes the light-reflecting strip.

According to one embodiment of the present invention, a light-reflecting strip is provided and the light-reflecting strip includes:

a light-reflecting substrate having a configuration surface and a smooth surface;

a light-reflecting base layer coated on the configuration surface;

a reflecting layer deposited on the light-reflecting base layer by evaporation deposition;

a high transmittance colorant layer printed on the reflecting layer by means of a screen printing with a screen having a mesh number greater than 300;

an adhesive layer applied on the smooth surface of the light-reflecting substrate; and a release paper detachably adhered to the adhesive layer.

According to another aspect of the present invention, a liquid crystal display device is provided which includes:

a liquid crystal display panel; and a back-light module disposed at a back side of the liquid crystal display panel and having an active light source and at least one light-reflecting strip of the above-described embodiment of the present invention.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein.

DETAILED DESCRIPTION OF THE INVENTION

Figure 1:
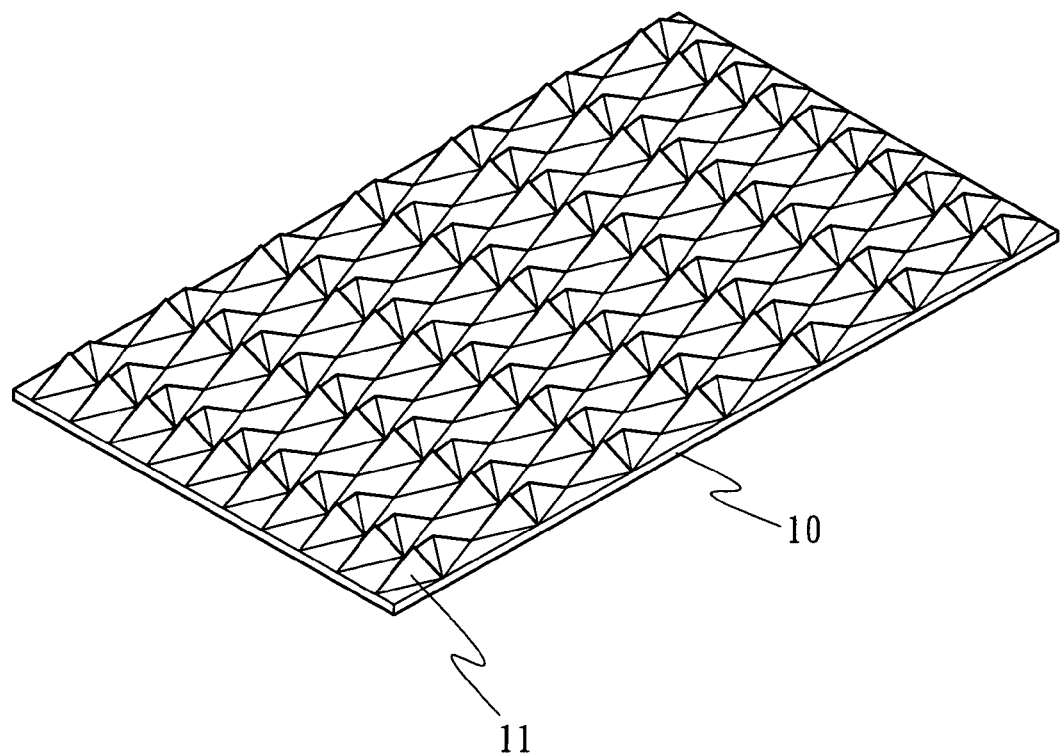
FIG. 1 is a schematic perspective view of a light-reflecting substrate used in a light-reflecting strip according to one embodiment of the present invention.
Figure 2:
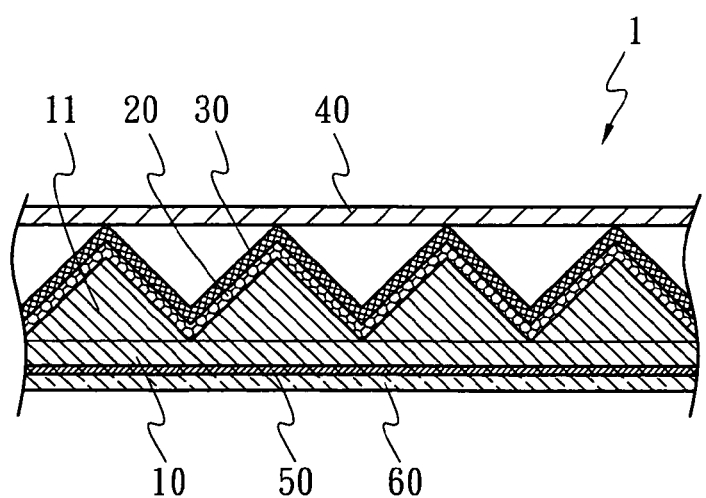
FIG. 2 is a schematic cross-sectional view of a light-reflecting strip according to an embodiment of the present invention.

Referring now to FIGS. 1 and 2 to describe a light-reflecting strip for a liquid crystal display according to a preferred embodiment of the present invention. FIG. 1 is a schematic perspective view illustrating a light-reflecting substrate 10 used in a light-reflecting strip according to one embodiment of the present invention. The light-reflecting substrate 10 has a configuration surface on which a matrix of protruded pyramid embossing patterns 11 are formed. Although in this embodiment a surface configuration having a matrix of protruded pyramid embossing patterns is used as a surface configuration of the light-reflecting substrate, other surface configurations, such as a semi-spherical configuration, may be adapted as the surface configuration of the light-reflecting substrate of the light-reflecting strip of the present invention.

FIG. 2 is a schematic cross-sectional view of a light-reflecting strip 1 according to a preferred embodiment of the present invention. As shown in FIG. 2, the light-reflecting strip 1 includes a light-reflecting substrate 10 having a configuration surface on which a matrix of protruded pyramid embossing patterns 11 are formed. The light-reflecting strip 1 further includes a light-reflecting base layer 20 which is formed on the pyramid embossing patterns 11 by way of vapor transfer printing or coating in order to prevent light being refracted and scattered by the pyramid embossing patterns 11 and to enhance the light concentration and reflection characteristics of the light-reflecting substrate 10. In this embodiment, silicon is used as the material of the light-reflecting base layer 20 and coated on the pyramid embossing patterns 11, however, any material having above-mentioned characteristics may be used as well. A shown in the figure, the light-reflecting strip 1 further includes a reflecting layer 30 formed on the light-reflecting base layer 20 by means of evaporation deposition in order to create a mirror effect on the pyramid embossing patterns 11 and to allow the light-reflecting strip 1 to have a total reflection effect and to increase the luminance. In this embodiment, aluminum is used as the material of the reflecting layer 30, however, any material that can create above-mentioned optical characteristics may be used as well. The light-reflecting strip 1 of the present invention further includes a high transmittance colorant layer 40 which is formed on a transparent layer (not shown) on top of the pyramid embossing patterns 11 as illustrated in FIG. 2 by means of screen printing process in order to allow the light-reflecting strip 1 of the present invention to have a color that matches with a color of the electronic apparatus in which the light-reflecting strip 1 is used, such as a color of black or silver. In order to produce a colorant layer 40 having an optimum light transmittance, a screen having a mesh number greater than 300 is preferably used in the screen printing process so as to allow the colorant layer 40 to have an optimum light transmittance and to avoid light loss while transmitting through the colorant layer 40. The light-reflecting strip 1 of the present invention further includes an adhesive layer 50 which is provided on a smooth surface, opposite to the configuration surface, of the light-reflecting substrate 10. Also, a release paper 60 is detachably attached to the adhesive layer 40.

Figure 3:
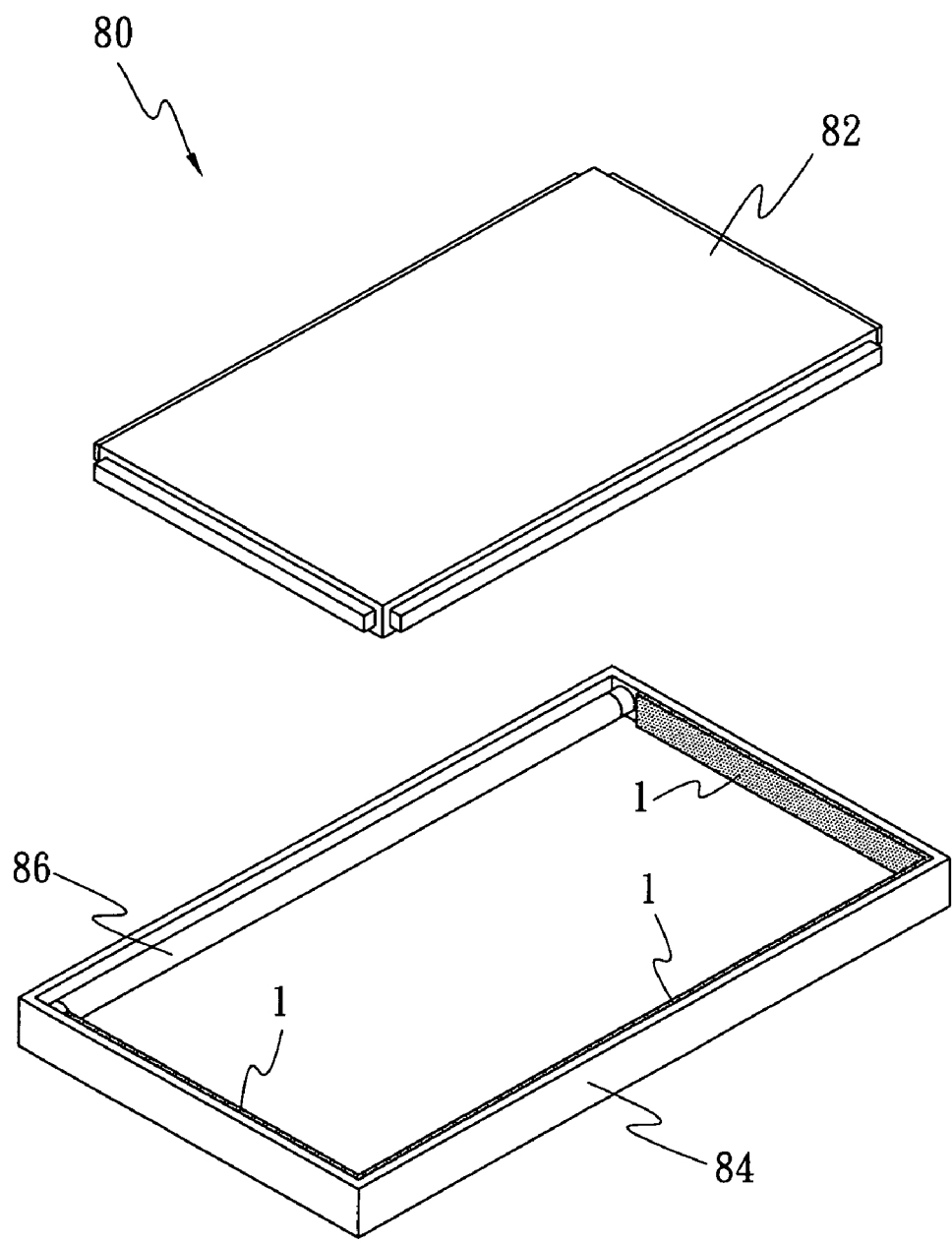
FIG. 3 is a schematic exploded perspective view showing a liquid crystal display device according to an embodiment of the present invention in which three light-reflecting strips are provided in a back-light module.

Next, reference is made with FIG. 3 to describe a liquid crystal display device 80 according to another aspect of the present application in which three light-reflecting strips 1 are used. As shown in FIG. 3, the liquid crystal display device 80 generally includes a liquid crystal panel 82 and a back-light module 84 disposed at a back side of the liquid crystal panel 82 as a back-light light source of the liquid crystal panel. An active light source, such a cold cathode tube 86, is provided at one side of the back-light module 84 and the other three sides are attached with the light-reflecting strips 1 as passive light sources so as to utilize the high reflectance of the light-reflecting strips 1 to effectively reflect the light incident on the light-reflecting strips 1 to provide sufficient and uniform luminance to illuminate the liquid crystal panel 82.

In general, traditional liquid crystal display devices use a number of active light sources, such as cold cathode tubes or LED, as back-light light sources to provide required luminance. However, because these active light sources require electric power to illuminate the more active light sources the liquid crystal display devices the more electric power is consumed and the more heat is generated as well, which in turn creates a greater heat dissipation problem to the liquid crystal display devices. In contrast to this, the light-reflecting strip of the present invention provides luminance by reflecting light incident thereon and thus no electric power is consumed to illuminate light and no heat is generated while illuminating. Therefore, the liquid crystal display device utilizing the light-reflecting strips of the present invention as back light sources needs much fewer number of active light sources than traditional liquid crystal display devices to obtain the same or even higher luminance level as that of the traditional liquid crystal display devices. The liquid crystal display device 80 that includes the light-reflecting strip 1 of the present invention can dramatically reduce the electric power consumption as well as the heat generation so as to effectively solve the problems of high energy consumption, high heat generation and difficulty of dissipating heat that exist in traditional liquid crystal display devices. Because the light-reflecting strip of the present invention and the liquid crystal display device including the light-reflecting strip posses above-mentioned advantages and superior functions, the light-reflecting strip and liquid crystal display device of the present invention are creations that have a great industrial applicability.

Although the light-reflecting strip and liquid crystal display device of the present invention have been described above according to the preferred embodiments thereof, this does not mean that the scope of the present invention is limited to specific structures and processing techniques described above. It will be apparent to people skilled in this art that many modifications can be made to the disclosed structures without departing from the scope of the invention. Therefore, it is the intent of the appended claims to cover all such variations and modifications as come within the spirit and scope of this invention.

What is claimed is:

1. A light-reflecting strip for a liquid crystal display device comprising:
   a light-reflecting substrate having a configuration surface with protrusions and a smooth surface opposite to the configuration surface;
   a light-reflecting base layer coated on the configuration surface;
   a reflecting layer deposited on the light-reflecting base layer;
   a high transmittance colorant layer on the protrusions of the reflecting layer, the colorant layer printed by means of a screen printing with a screen having a mesh number greater than 300;
   an adhesive layer applied on the smooth surface of the light-reflecting substrate; and
   a release paper detachably adhered to the adhesive layer.

2. A light-reflecting strip for a liquid crystal display device according to claim 1, wherein the configuration surface has a matrix of protruded pyramid embossing patterns formed thereon.

3. A light-reflecting strip for a liquid crystal display device according to claim 1, wherein the light-reflecting base layer comprises silicon and is formed on the configuration surface by means of vapor transfer printing or coating.

4. A light-reflecting strip for a liquid crystal display device according to claim 1, wherein the reflecting layer comprises aluminum and is formed on the light-reflecting layer by evaporation deposition.

5. A light-reflecting strip for a liquid crystal display device according to claim 1, wherein the configuration surface has a matrix of protruded semi-spherical patterns formed thereon.

6. A liquid crystal display device comprising:
   a liquid crystal display panel; and
   a back-light module disposed at a back side of the liquid crystal display panel and having an active light source and at least one light-reflecting strips according to any one of claims 1-5.

* * * * *